United States Patent
Whitney et al.

(10) Patent No.: US 11,218,879 B2
(45) Date of Patent: Jan. 4, 2022

(54) PROVIDING SECURITY THROUGH CHARACTERIZING INTERNET PROTOCOL TRAFFIC TO DETECT OUTLIERS

(71) Applicant: AT&T Intellectual Property I, L.P., Atlanta, GA (US)

(72) Inventors: Joshua Whitney, Richardson, TX (US); Meredith Ordway-West, Austin, TX (US); Aarthi Reddy, Allen, TX (US); Melissa Lee, McKinney, TX (US); Mukund Rao, Dallas, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 102 days.

(21) Appl. No.: 16/210,601

(22) Filed: Dec. 5, 2018

(65) Prior Publication Data

US 2020/0187009 A1  Jun. 11, 2020

(51) Int. Cl.
| | |
|---|---|
| *H04W 12/104* | (2021.01) |
| *H04W 24/08* | (2009.01) |
| *H04L 12/851* | (2013.01) |
| *H04W 4/02* | (2018.01) |
| *G06F 16/29* | (2019.01) |

(Continued)

(52) U.S. Cl.
CPC .......... *H04W 12/104* (2021.01); *G06F 16/29* (2019.01); *G06N 7/005* (2013.01); *H04L 47/2441* (2013.01); *H04W 4/02* (2013.01); *H04W 12/63* (2021.01); *H04W 24/08* (2013.01); *H04W 40/20* (2013.01)

(58) Field of Classification Search
CPC ............. H04L 61/2007; H04L 47/2441; H04L 63/1425; H04L 67/22; G06F 21/316; G06F 16/29; G06N 7/005; H04W 12/1004; H04W 12/00503; H04W 12/00505; H04W 12/12; H04W 4/02; H04W 24/08; H04W 40/20
See application file for complete search history.

(56) References Cited

U.S. PATENT DOCUMENTS

| | | |
|---|---|---|
| 7,366,919 B1 | 4/2008 | Sobel et al. |
| 8,428,098 B2 | 4/2013 | Chen et al. |
| | (Continued) | |

FOREIGN PATENT DOCUMENTS

| | | |
|---|---|---|
| CN | 105577477 A | 5/2016 |
| KR | 100613904 B1 | 8/2006 |
| WO | 2018076571 A1 | 5/2018 |

OTHER PUBLICATIONS

Kim, Myung-Sup, et al. "A flow-based method for abnormal network traffic detection." Network Operations and Management Symposium, 2004. NOMS 2004. IEEE/IFIP. Vol. 1. IEEE, 2004. https://www.researchgate.net/profile/Seong_Cheol_Hong/publication/220707712_A_Flow-based_Method_for_Abnormal_Network_Traffic_Detection/links/53dee0870cf2cfac99294fbf/A-Flow-based-Method-for-Abnormal-Network-Traffic-Detection.pdf.

(Continued)

*Primary Examiner* — Margaret G Mastrodonato

(57) ABSTRACT

A method, computer-readable medium, and apparatus for classifying IP network traffic are disclosed. For example, a method may include a processor for applying a regularized probabilistic model to internet protocol network traffic for performing geolocation, wherein the internet protocol network traffic contains internet protocol address information, detecting an outlier in the internet protocol network traffic, wherein the outlier is associated with a transaction over a network, and performing a remedial action to address the outlier.

20 Claims, 4 Drawing Sheets

(51) Int. Cl.
  *G06N 7/00* (2006.01)
  *H04W 40/20* (2009.01)
  *H04W 12/63* (2021.01)

(56) References Cited

U.S. PATENT DOCUMENTS

| | | | |
|---|---|---|---|
| 9,038,172 | B2 | 5/2015 | Miller et al. |
| 9,280,750 | B2 | 3/2016 | Prieditis |
| 9,515,984 | B1 | 12/2016 | Griggs et al. |
| 9,680,877 | B2 | 6/2017 | Duffield et al. |
| 9,705,914 | B2 | 7/2017 | Di et al. |
| 9,838,301 | B2 | 12/2017 | Prieditis |
| 10,097,420 | B2 | 10/2018 | Li et al. |
| 2011/0029469 | A1* | 2/2011 | Yamada ............ G06F 17/18 706/14 |
| 2017/0083985 | A1* | 3/2017 | Lacoss-Arnold ...... G06Q 40/12 |
| 2017/0085577 | A1 | 3/2017 | Wise et al. |
| 2017/0279827 | A1 | 9/2017 | Savalle et al. |
| 2017/0279847 | A1 | 9/2017 | Dasgupta et al. |
| 2017/0310691 | A1 | 10/2017 | Vasseur et al. |
| 2017/0339022 | A1 | 11/2017 | Hegde et al. |
| 2018/0027416 | A1 | 1/2018 | Bickford et al. |
| 2018/0077182 | A1 | 3/2018 | Sartran et al. |
| 2019/0036795 | A1* | 1/2019 | Ouyang ............ H04L 43/14 |
| 2019/0180175 | A1* | 6/2019 | Meteer ............ G06F 40/289 |
| 2019/0392351 | A1* | 12/2019 | Zuluaga ............ G06F 17/18 |
| 2020/0074439 | A1* | 3/2020 | Hayman ............ G06Q 20/3224 |

OTHER PUBLICATIONS

Gu, Yu, Andrew McCallum, and Don Towsley. "Detecting anomalies in network traffic using maximum entropy estimation" Proceedings of the 5th ACM SIGCOMM Conference on Internet Measurement. USENIX Association, 2005. https://www.usenix.org/legacy/event/imc05/tech/full_papers/gu/gu.pdf.

Auld, Tom, Andrew W. Moore, and Stephen F. Gull. "Bayesian neural networks for internet traffic classification." IEEE Transactions on Neural Networks 18.1 (2007): 223-239. https://www.cl.cam.ac.uk/~awm22/publication/auld2006bayesian.pdf.

Barford, Paul, et al. "A signal analysis of network traffic anomalies." Proceedings of the 2nd ACM SIGCOMM Workshop on Internet Measurment. ACM, 2002. http://www.cs.cmu.edu/~srini/15-744/readings/BKPR02.pdf.

Ganjali, Phillipa Gill Yashar, Bernard Wong, and David Lie. "Dude, where's that IP? Circumventing measurement-based IP geolocation." accessed: 2018. http://static.usenix.org/events/sec10/tech/full_papers/Gill.pdf.

Soldo, Fabio, and Metwally, Ahmed. "Traffic anomaly detection based on the IP size distribution." 2012 Proceedings IEEE Infocom. 2012. https://static.googleusercontent.com/media/research.google.com/en//pubs/archive/37739.pdf.

* cited by examiner

PROVIDING SECURITY THROUGH CHARACTERIZING INTERNET PROTOCOL TRAFFIC TO DETECT OUTLIERS

The present disclosure relates generally to methods, computer-readable media and apparatuses for characterizing Internet Protocol (IP) traffic.

BACKGROUND

The process of associating a physical location to an Internet Protocol (IP) address is known as "geolocation." Various databases can be utilized to associate an IP address to a physical location. For example, geolocation databases like MaxMind™ GeoLite2™ can be used to assign a location to an IP address. However, geolocation databases present challenges like inaccurate coordinates and location aggregation to geographic centers that can make using outlier detection techniques problematic.

SUMMARY

In one example, the present disclosure discloses a method, computer-readable medium, and apparatus for classifying IP network traffic. For example, a method may include a processor for applying a regularized probabilistic model to internet protocol network traffic for performing geolocation, wherein the internet protocol network traffic contains internet protocol address information, detecting an outlier in the internet protocol network traffic, wherein the outlier is associated with a transaction over a network, and performing a remedial action to address the outlier.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
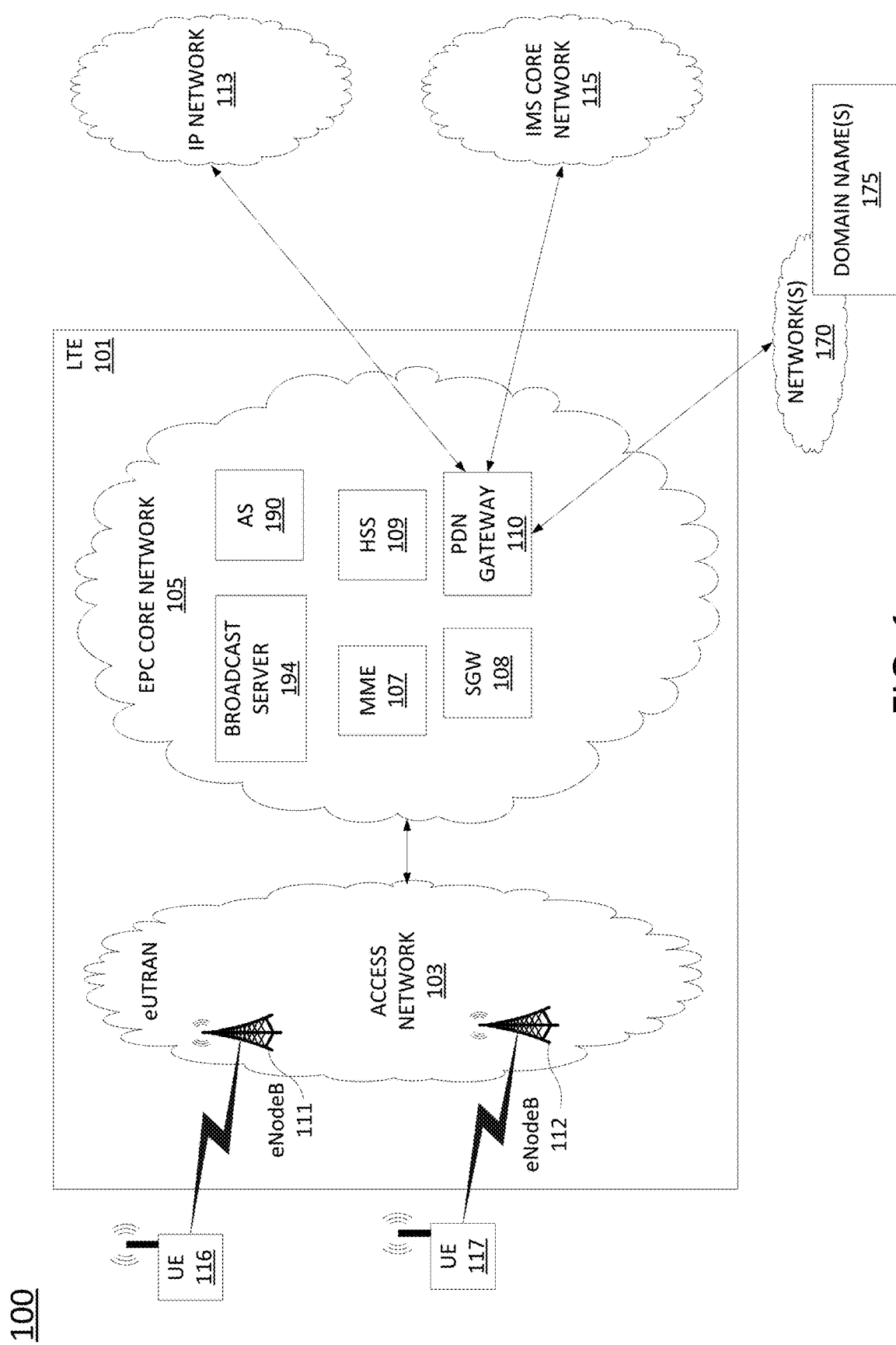
FIG. 1 illustrates an example system related to the present disclosure.

The present disclosure broadly discloses methods, computer-readable media and apparatuses for characterizing Internet Protocol (IP) traffic for securing a network or an endpoint device. In another application, the characterizing of the IP traffic can be used for fraud detection and prevention. The proper association of a physical location to an IP address provides useful benefits. In one example, fraud detection and/or prevention can be implemented based on the proper implementation of geolocation for credit card transactions for orders placed over the Internet. Suppose, for example, a system observes that all historic orders for credit card "A" are placed from IP addresses within a radius of 100 miles from a particular location, e.g., Phoenix, Ariz. If the system suddenly detects an order (broadly a transaction) placed from an IP address in east Asia, then the system may flag that order as an outlier warranting further investigation or the system may actually block the order altogether. Similarly, detecting the outlier can be used to protect the network that the transaction is traversing over and/or the endpoint device that initiated the order. For example, the transaction may be part of a denial of service (DoS) attack or is an indication that the corresponding endpoint device may be infected with a malicious program and so on. Again, such transactions may warrant further investigation or the system may actually block these transactions altogether to address potential attacks on the network, a website, or the endpoint device.

The present disclosure focuses on geospatial coordinate data associated to an IP address identifying an endpoint device communicating over the Internet with a network that is being monitored. However, the techniques described herein are broadly generalizable with minimal alteration to any data containing latitude/longitude coordinate pairs known, potentially, only with poor accuracy. As indicated above, geolocation databases present challenges like inaccurate coordinates and location aggregation to geographic centers that can make using outlier detection techniques problematic.

In one illustrative example, the geospatial data used in detecting outliers can be obtained by associating latitude/longitude coordinate pairs to IP addresses via use of a geolocation database, e.g., using an open source geolocation database such as GeoLite2™ produced by MaxMind™. It should be noted other geolocation databases can be used and the method of the present disclosure is not limited to any particular geolocation database. In one embodiment, the present method may monitor traffic on network devices such as firewalls and/or proxy servers and the method may then associate a coordinate pair to each traffic observation containing an external IP address. The volume of traffic may vary greatly by device. A low traffic device like a virtual private network might see a few thousand traffic observations in a day, and for high traffic devices (e.g., like firewalls) hundreds of millions of observations is common.

Unfortunately, the accuracy of geolocation databases is suspect. For example, some databases claim accuracy from 99.8% at the country level to 81% accuracy within 50 km for cities in the United States. This accuracy may change over time as geolocation techniques improve. Unfortunately, there is an important aspect that must be addressed. Some geolocation databases indicate that the latitude and longitude coordinates returned for a given IP address are near either the population or geographic center of the most granular location data returned for that IP address (i.e., country, region/state, city, or postal code). For example, if the database can only claim accuracy at the country level, then the latitude/longitude coordinate pair is given at the defined geographic center of the country. For the United States, this center is just outside of Wichita, Kans. For example, in one geolocation database, there are approximately 250,000 distinct IP addresses assigned to this one single physical location. For the present disclosure, this issue will be referred to as the "geographic center assignment problem."

In one embodiment, the present method accounts for the geographic center assignment problem by using a probabilistic model (e.g., a Gaussian mixture model) that is regularized by restricting the number of clusters under consideration and weighting coordinates by the log of the number of traffic events at that coordinate. At first glance, one may assume that the easiest solution to the geographic center assignment problem is to treat these locations as a noise cluster in the Gaussian mixture model or to remove these locations altogether. However, much of the information is lost if the present method proceeds in this manner. More importantly, the geographic center still carries information, e.g., at worst, about the country of origin. Rather than discarding such data completely, the present method restricts the probabilistic model (e.g., the Gaussian mixture model) so overfitting at these locations is limited.

In one illustrative embodiment, the present method detects "outliers" in the location data comprising latitude/longitude coordinate pairs by using a Gaussian mixture model (GMM). The approach of the present method is to estimate the probability density of the training data using a GMM and then label as outliers any new observations occurring in low density regions. However, the present method specifically addresses the difficulties that arise from inaccuracies in the coordinate data obtained from IP lookups described above. It should be noted that, in the present context the term "outlier" is defined as an observation occurring with very low probability as compared to other observations in a sample given a distribution from which the sample is drawn.

In one example, spatial outlier detection may mean identifying geospatial locations that are very different from their nearest geospatial neighbors on some non-geospatial attribute. For instance, a method may identify counties that are very demographically different from their nearest neighboring counties. In that context, the non-geospatial attributes in question are demographic statistics. In the context of the present disclosure, however, the present method seeks to identify geospatial origins of the network traffic that are geospatially distant from locations where the present method has seen traffic in the past. One possible attempt to solve this problem is to measure the volume of traffic at a particular location and then compare the measured volume to the historic traffic volumes of the particular location's nearest geospatial neighbors. Outliers would then appear as locations with large amounts of traffic compared to its low traffic neighbors, or small amounts of traffic compared to its high traffic neighbors. The non-geospatial attribute in question would be traffic volume. However, given the inaccuracy of the IP address lookup operation, it is difficult to ascribe traffic location with sufficient accuracy to make this solution effective.

A Gaussian mixture model (GMM) is a multipurpose unsupervised learning algorithm. The output of a GMM can be used for "soft" clustering of observations. However, the present method will instead utilize the fact that a GMM provides, in a very general setting, an estimate of the probability density function of the distribution from which the data were drawn. More precisely, let $\{x_1, \ldots, x_m\}$ be a sample of m independent identically distributed observations of n variables. A GMM assumes that the distribution of each observation has a probability density function f given by a finite mixture of the form:

$$f(x; \pi, \mu_1, \ldots, \mu_G, \Sigma_1, \ldots, \Sigma_G) = \sum_{i=1}^{G} \pi_i g(x; \mu_i, \Sigma_i).$$  EQU. 1

Here G is the number of groups or clusters (to be chosen as described below) and $\pi = (\pi_1, \ldots, \pi_G) \in \mathbb{R}^G$ are the weights of each of the Gaussian distributions with probability density function:

$$g(x; \mu_i, \Sigma_i) = \frac{1}{\sqrt{\det(2\pi \Sigma_i)}} \cdot \exp\left(-\frac{1}{2}(x-\mu_i)^T \Sigma_i^{-1} (x-\mu_i)\right).$$  EQU. 2

Each $\mu_i \in \mathbb{R}^n$ and $\Sigma_i \in \mathbb{R}^{n \times n}$ are the mean and the covariance of the $i^{th}$ Gaussian distribution, respectively, and the $\pi_i$'s satisfy $\pi_i \geq 0$ and all i and $\Sigma_{i=1}^{G} \pi_i = 1$.

There are many options available to define outliers once the probability density from a GMM has been obtained. For example, one option is to define a scaled outlier score wherein each datum is compared to the others in a dataset based on the probability density. In one embodiment, the present method will use a heuristically determined threshold in which a datum is considered an outlier if its probability density as determined by a trained GMM is below a defined value or threshold, e.g., 0.007. For example, a method may choose a threshold so that a criterion where "most (or all)" of the data in the test set are classified as non-anomalous. In one example, it has been observed that the threshold of 0.007 may meet such criterion across the data sets for which a GMM was trained in the present context, but was strict enough that subjectively defined outliers were correctly detected. Furthermore, in one embodiment this threshold corresponds to a log-likelihood of −5.

In one example, it has been noted that GeoLite2™ placed around 80% of IP addresses within 100 km of their global ground truth latitude/longitude test dataset. Thus, in one illustrative embodiment pertaining to GeoLite2™, the present method would be overstating the accuracy of the coordinate measurement if the present method states the latitude/longitude coordinate pairs to any more precision than the nearest integer. As such, the present method may round the coordinates to the nearest whole number (giving around 111 km of precision) and aggregate the data to count the number of traffic observations at a given coordinate. This has the beneficial side effect that the present method ends up with approximately 4,000 weighted observations in a typical training set instead of several billions.

In one illustrative embodiment, the present method uses the function "me.weighted" in the R package "mclust" to train a GMM on rounded coordinate data weighted by the log of the number of traffic observations at the given coordinate. In one example, the function "me.weighted" implements a version of the expectation maximization (EM) algorithm on weighted data beginning with the M step. To initialize the algorithm (the initial E step) for a given value of G, the present method uses repeated random initial assignment keeping the one that maximizes the resulting log-likelihood. Weighting by the log of the number of observations can be considered a form of regularization, in the sense that a regularization technique is an alteration of the objective function under consideration to avoid overfitting of a model. Using unweighted data (or, equivalently, data weighted by raw traffic counts) will quickly run afoul of the geographic center assignment problem as noted above. For example, locations like Wichita, Kans. would consume nearly all of the probability distribution f output by the GMM in EQU. 1 because so many traffic observations are assigned at their respective geographic center. This results in a vanishingly small probability density being assigned to nearly all traffic observations outside of small regions around geographic centers. This is erroneous because many of the traffic observations at geographic centers are only known with large measurement error, and thus the actual location is far from the stated value. In short, the present method overfits the GMM to the geographic centers.

One way to choose the number of groups, G, is to fit a GMM for a range of G values and choose the value of G which maximizes the Bayesian Information Criterion (BIC). Another form of regularization in light of the geographic center assignment problem is an a priori restriction on the number of groups G under consideration. For example, if one were to maximize BIC by allowing G to grow without bound, one would obtain many small clusters which overstate the geographic accuracy of the underlying data. Heuristically, the present method found that only considering G for which:

$$G \le \min\left(20, \left\lceil \frac{d}{12} \right\rceil\right), \quad \text{EQU. 3}$$

where d is the number of distinct rounded coordinates in the training set and [.] is the ceiling function, yielded good performance across a variety of datasets. As support for this heuristic, a plot of BIC vs. G can be made with a loose fit and 95% confidence intervals of the mean. It has been observed that the curve levels off substantially by G=12 and increases minimally thereafter, though the maximum BIC occurs well after G=20.

To address the geographic center assignment problem, the present method provides an evaluation method to demonstrate the robustness of the present method against the geographic center assignment problem. For example, the evaluation method fixes a positive integer k. In step 1, the evaluation method obtains a training set comprising traffic observations from one firewall for a period of time, e.g., one week. In one example, subset the data to only traffic originating in the continental US. In step 2, the evaluation method obtains a testing set similarly but from data for the week following the training set. In step 3, the evaluation method trains two baseline GMMs on the original training set. The first baseline GMM is regularized as discussed above, and the second is trained on raw traffic counts with no limit on the range of G. That is, the latter baseline model is unregularized. In step 4, the evaluation method selects a number $p \in (0,1)$. In step 5, the evaluation method randomly selects a proportion p of observations from the training set and move them to the geographic center of the US, e.g., in Wichita, Kans. In step 6, the evaluation method retrains the regularized and unregularized GMMs on the altered training set. One can call these p-altered regularized and unregularized models, respectively. In step 7, the evaluation method calculates correlation between test set predictions of the baseline models and the p-altered models. In step 8, the evaluation method repeats steps 5-7 k times and finds the average correlation from step 7. In step 9, the evaluation method repeats steps 4 through 8 for several values of p. Finally, one can then compare the correlations for the regularized and unregularized models to see that the correlations are much higher for the regularized models. Thus, the present method is demonstrated to provide robustness against the geographic center assignment problem.

In one embodiment, in order to demonstrate the regularized models' ability to detect outliers, the present method may use both simulated and actual data. For simulated data, the present method may proceed as follows. In step 1, the present method obtains training and testing sets, e.g., as discussed above in steps 1-2 of the evaluation method. In step 2, the present method may add simulated outliers (e.g., various geographic locations) to the testing set, e.g., in Hong Kong; Paris, France; Johannesburg, South Africa; Mexico City, Mexico; Rio de Janeiro, Brazil; and Montreal, Canada. In step 3, the present method may assign a probability density to each observation in the testing set based on the regularized GMM trained on the training set. In step 4, the present method may order the coordinates by their probability density and determine where the simulated outliers rank. The present method may also determine which simulated outliers are classified correctly by the definition as discussed above. For actual data, the present method proceeds similarly but rather than adding simulated outliers to the testing set, the present method chooses the testing set from real data that demonstrates the outlier detection capabilities of the GMM.

The present disclosure broadly discloses methods, computer-readable media and apparatuses for characterizing Internet Protocol (IP) traffic for securing a network or an endpoint device and/or for fraud detection and prevention. In one embodiment of the present disclosure, the present method generates and applies a probabilistic model, e.g., a GMM, to network traffic, e.g., network-based transactions to deduce proper association of a physical location to an IP address.

In one example, it is beneficial for network operators, service providers, financial institutions such as credit card companies and merchants to understand various aspects of the network traffic traveling across networks to maintain security and/or to detect fraudulent activities via detection of outliers. This type of knowledge pertaining to outliers is very useful in providing one or more remedial actions, e.g., actions that respond to a security threat, actions that respond to a network performance issue, actions that respond to a fraudulent activity, and actions that respond to a policy enforcement issue.

In the example of a mobile malware threat, network service providers will want to be able to identify the specific mobile devices that are causing harm to their network and/or customers. For example, user mobile endpoint devices that are infected with malware, may send thousands of unwarranted messages per day and/or execute transactions, e.g., making unauthorized purchases without the knowledge of the customers. In other malware scenarios, malware may turn mobile endpoint devices into an international SMS proxy, resulting in large accidental costs to infected customers and the network service provider. In these types of events, being able to identify infected user mobile endpoint devices would allow a network service provider to quickly reduce the spread of infection as well as harm to both the network and customers. These and other aspects of the present disclosure are described in greater detail below in connection with the discussion of FIGS. 1-4.

To better understand the present disclosure, FIG. 1 illustrates an example network, or system 100 suitable for implementing embodiments of the present disclosure for location anomaly detection. In one example, the system 100 comprises a Long Term Evolution (LTE) network 101, an IP network 113, and a core network, e.g., an IP Multimedia Subsystem (IMS) core network 115. In one example, system 100 is provided and operated by a cellular network operator. FIG. 1 also illustrates various user mobile endpoint devices, e.g., LTE user endpoint devices 116 and 117. The user mobile endpoint devices 116 and 117 may each comprise a cellular telephone, a smartphone, a tablet computing device, a laptop computer, a pair of computing glasses, a wireless enabled wristwatch, or any other cellular-capable mobile telephony and computing device (broadly, "mobile endpoint devices"). Each of the user mobile endpoint devices is capable of executing one or more mobile software applications, e.g., software applications for transmitting and/or receiving multimedia content, gaming, shopping, surfing the web, sending and receiving data, sending and receiving messages such as emails and text messages, implementing call sessions such as voice over IP calls, video conferencing, and the like.

In one example, the LTE network 101 comprises an access network 103 and a core network 105. In one example, the access network 103 comprises an evolved Universal Terrestrial Radio Access Network (eUTRAN). The eUTRANs are the air interfaces of the 3rd Generation Partnership Project (3GPP) LTE specifications for mobile networks. In one example, the core network 105 comprises an Evolved Packet Core (EPC) network. An EPC network provides various functions that support wireless services in the LTE environment. In one example, an EPC network is an Internet Protocol (IP) packet core network that supports both real-time and non-real-time service delivery across a LTE network, e.g., as specified by the 3GPP standards. In one example, all eNodeBs in the access network 103 are in communication with the EPC network 105. In operation, LTE user equipment or user endpoints (UE) 116 may access wireless services via the eNodeB 111 and the LTE UE 117 may access wireless services via the eNodeB 112 located in the access network 103. It should be noted that any number of eNodeBs can be deployed in an eUTRAN. In one illustrative example, the access network 103 may comprise one or more eNodeBs.

In EPC network 105, network devices Mobility Management Entity (MME) 107 and Serving Gateway (SGW) 108 support various functions as part of the LTE network 101. For example, MME 107 is the control node for the LTE access-network. In one embodiment, it is responsible for UE (User Equipment) tracking and paging (e.g., such as retransmissions), bearer activation and deactivation process, selection of the SGW, and authentication of a user. In one embodiment, SGW 108 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 105 may comprise a Home Subscriber Server (HSS) 109 that contains subscription-related information (e.g., subscriber profiles), performs authentication and authorization of a wireless service user, and provides information about the subscriber's location. The EPC network 105 may also comprise a public data network (PDN) gateway 110 which serves as a gateway that provides access between the EPC network 105 and various data networks, e.g., other IP networks 113, an IMS core network 115, and the like. The public data network gateway is also referred to as a PDN gateway, a PDN GW or a PGW.

The EPC network 105 may also include an application server (AS) 190. In one embodiment, AS 190 may comprise a computing system, such as computing system 400 depicted in FIG. 4, and may be configured to provide one or more functions for location anomaly detection, and for performing various other operations in accordance with the present disclosure. Accordingly, the AS 190 may be connected directly or indirectly to any one or more network elements of EPC network 105, and of the system 100 in general, that are configured to gather and forward network analytic information, such as signaling and traffic data, and other information and statistics to AS 190 and to receive instructions from AS 190. In addition, AS 190 may be configured to receive requests to implement one or more remedial actions as discussed below after location anomaly detection. For example, one or more of the domain names 175 (e.g., websites where transactions are being processed) may be reached via networks 170. AS 190 may be further configured to perform other functions such as those described below in connection with the example methods 200 and 300 of FIGS. 2 and 3.

In one example, AS 190 may be deployed in a network operations center (NOC) of a cellular network operator, e.g., an entity operating the EPC network 105, LTE network 101, access network 103, IP network 113, core network 115, and so on. Due to the relatively large number of connections available between AS 190 and other network elements, none of the actual links to the application server are shown in FIG. 1. Similarly, links between MME 107, SGW 108, broadcast server 194, eNodeBs 111 and 112, PDN gateway 110, and other components of system 100 are also omitted for clarity.

The foregoing description of the system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, AS 190, broadcast server 194 and/or other network components may be deployed in IMS core network 115 instead of being deployed within the EPC network 105, or in other portions of system 100 that are not shown, while providing essentially the same functionality.

In addition, although aspects of the present disclosure have been discussed above in the context of a long term evolution (LTE)-based wireless network, examples of the present disclosure are not so limited. Thus, the teachings of the present disclosure can be applied to other types of wireless networks (e.g., 2G network, 3G network, 5G network and the like), for location anomaly detection. Thus, these and other modifications are all contemplated within the scope of the present disclosure.

The present disclosure uses a method that models location anomaly detection via traffic volume, which can potentially identify infected user endpoint devices and/or fraudulent activities. One aspect of the present approach is to provide a probabilistic model that is robust to the geographic center assignment problem. Additionally, despite this robustness, the present probabilistic model is still capable of detecting outliers as long as those outliers are geographically far from observations in the training set.

Figure 2:
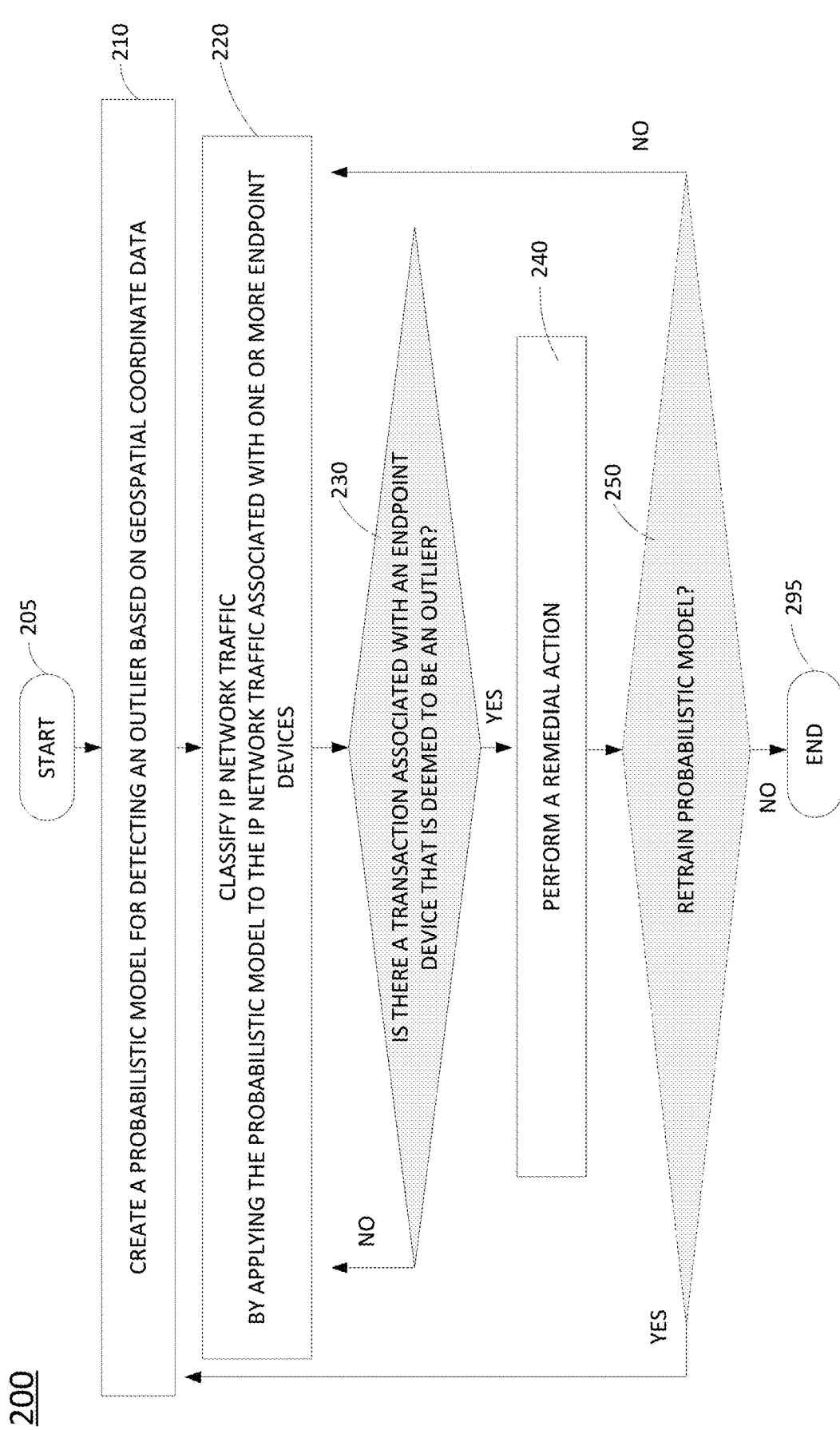
FIG. 2 illustrates a flowchart of an example method for classifying IP traffic for securing a network or a mobile user endpoint device, according to the present disclosure.

FIG. 2 illustrates a flowchart of an example method 200 for location anomaly detection. In one embodiment, the steps, operations or functions of the method 200 may be performed by any one or more of the components of the system 100 depicted in FIG. 1. For example, in one embodiment, the method 200 is performed by the application server (AS) 190. In another embodiment, the method 200 is performed by AS 190 in coordination with other components of the system 100, such as broadcast sever 194 (for broadcasting various notifications), eNodeBs 111 and 112, and so forth. Alternatively, or in addition, one or more steps, operations or functions of the method 200 may be implemented by a computing device having a processor, a memory and input/output devices as illustrated below in FIG. 4, specifically programmed to perform the steps, functions and/or operations of the method. Although any one of the elements in system 100 of FIG. 1 may be configured to perform various steps, operations or functions of the method 200, the method will now be described in terms of an embodiment where steps of the method are performed by a processor, such as processor 402 in FIG. 4. For example, the processor may comprise a processor of a dedicated application server of a cellular network operator configured to perform location anomaly detection.

The method 200 begins in step 205 and proceeds to step 210. In step 210, the processor creates a probabilistic model for detecting an outlier based on geospatial coordinate data. For example, the probabilistic model, e.g., a GMM is trained and regularized as discussed above.

In step 220, the processor classifies network traffic by applying the trained probabilistic model to the IP network traffic associated with one or more endpoint devices. More specifically, the method applies a regularized probabilistic model to the IP network traffic for performing geolocation, where the IP network traffic contains internet protocol address information.

In step 230, the processor determines whether an outlier is detected. For example, the processor determines whether a transaction associated with an endpoint device is deemed to be an outlier based on its geographic location. If an outlier is not detected, method 200 returns to step 220. If an outlier is detected, method 200 proceeds to step 240.

In step 240, the processor performs a remedial action. For example, if a security or fraudulent issue is detected based on the outlier, the network service may take one or more of the following remedial actions: contacting a user (e.g., sending a notification) to notify him or her as to a potential security problem associated with an endpoint device that he or she is using (e.g., requesting the user to deactivate or de-install an offending software application or perform diagnostics on the endpoint device), blocking traffic to and from a particular software application or endpoint device, contacting a financial institution (e.g., sending a notification to a bank or a credit card company) to investigate or block a particular transaction, contacting a merchant (e.g., sending a notification to a vendor or an online company) to investigate or block a particular transaction, and the like. In another example, if a performance issue is detected, the network service may take one or more of the following remedial actions: blocking or throttling traffic to and from a particular endpoint device, blocking or throttling traffic to and from a particular IP address, informing a network ticketing system or maintenance system of the performance issue, and the like. In another example, if a policy enforcement issue is detected, the network service may take one or more of the following remedial actions: contacting a financial institution (e.g., a bank or a credit card) to notify them as to a potential policy enforcement problem associated with a transaction (e.g., notifying the credit card company of the geographic location associated with a particular transaction is outside of an acceptable distance or range), notifying the customer that a transaction has been detected for a particular endpoint device being used at a particular time of day, notifying the customer that a particular mobile endpoint device is being used at a particular location, and the like), blocking or throttling traffic to and from a particular domain name, blocking or throttling mobile traffic to and from a particular endpoint device, and the like.

In optional step 250, the processor determines whether the probabilistic model needs to be retrained. As discussed above, it may be necessary to retrain the probabilistic model periodically, e.g., using simulated or actual data. For example, the probabilistic model can be retrained daily, every two days, every week, or when the performance of the location anomaly detection falls below a predefined threshold (e.g., falling below 70% accuracy) and the like. If retraining is required, the method returns to step 210 to retain the probabilistic model. If retraining is not required, the method returns to step 220 or alternatively, ends in step 295.

Figure 3:
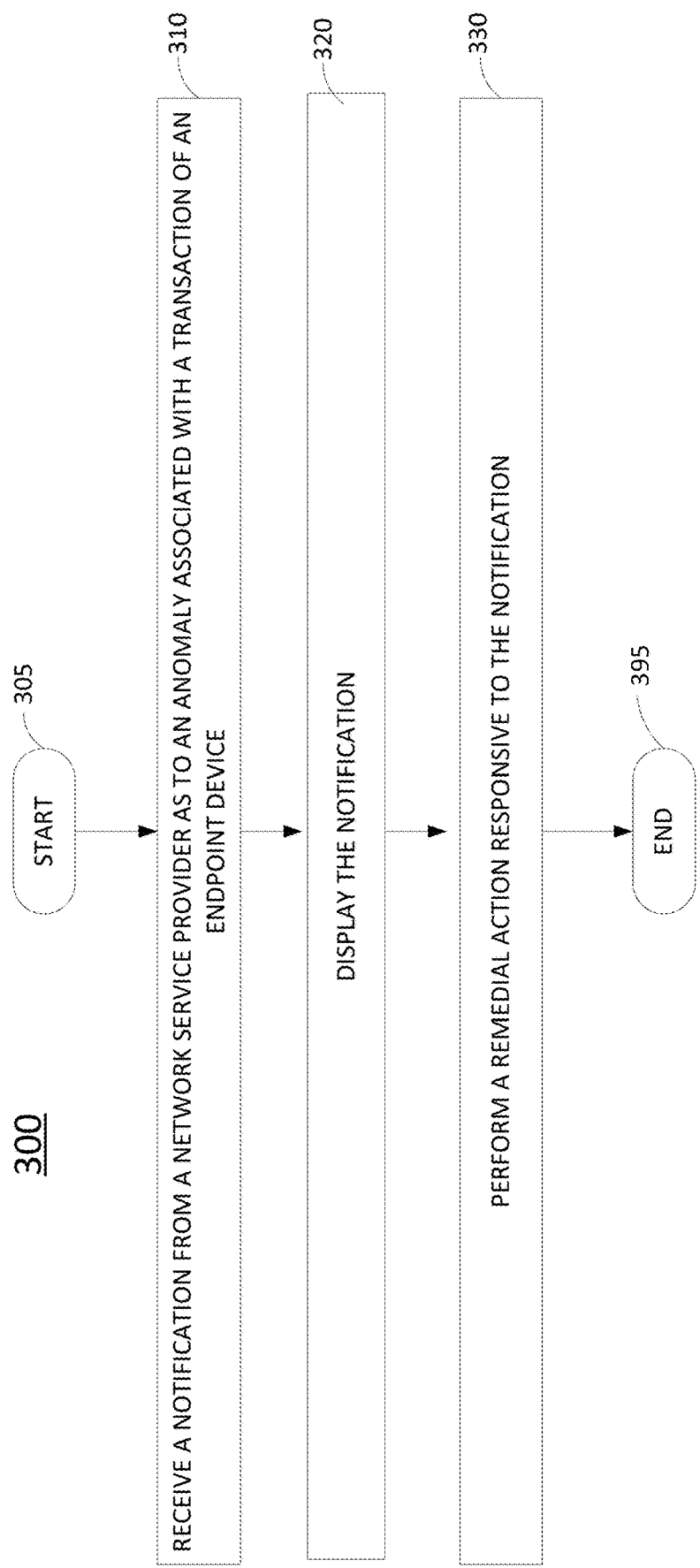
FIG. 3 illustrates a flowchart of an example method for receiving a notification from a network service provider as to an anomaly associated with a transaction of an endpoint device.

FIG. 3 illustrates a flowchart of an example method 300 for receiving a notification from a network service provider as to an endpoint device or a particular transaction being an anomaly. In one embodiment, the steps, operations or functions of the method 300 may be performed by any one or more of the components of the system 100 depicted in FIG. 1. For example, in one embodiment, the method 300 is performed by one of the mobile endpoint devices 116 or 117, or an application server of a financial institution or a merchant. In another embodiment, the method 300 is performed by one of mobile endpoint devices 116 or 117 in coordination with other components of the system 100, such as application server 190, and so forth. Alternatively, or in addition, one or more steps, operations or functions of the method 300 may be implemented by a computing device having a processor, a memory and input/output devices as illustrated below in FIG. 4, specifically programmed to perform the steps, functions and/or operations of the method. Although various elements in system 100 of FIG. 1 may be configured to perform various steps, operations or functions of the method 300, the method will now be described in terms of an embodiment where steps of the method are performed by a processor, such as processor 402 in FIG. 4. For example, the processor may comprise a processor of a mobile endpoint device.

The method 300 begins in step 305 and proceeds to step 310. In step 310, the processor receives a notification from a network service provider as to an anomaly associated with a particular transaction of an endpoint device. For example, the network service provider has detected a transaction as being an outlier as discussed above. In one example, the notification is sent directly to the user operating the endpoint device. Alternatively, the notification is sent to an entity responsible for the transaction, e.g., a bank, a credit card company or a merchant, and so on.

In step 320, the processor displays the notification to a user. For example, the notification is displayed on a screen of the user endpoint device. Alternatively, the notification is displayed on a screen of an endpoint device of a business entity or a governmental agency, a guardian, a parent and so on. Alternatively, the notification is displayed on a screen of an endpoint device of an entity responsible for the transaction.

In step 330, the processor takes or performs a remedial action as discussed above. Method 300 then ends in step 395.

It should be noted that the method 200 and method 300 may be expanded to include additional steps, or may be modified to replace steps with different steps, to combine steps, to omit steps, to perform steps in a different order, and so forth. For instance, in one example the processing system may repeat one or more steps of the method 200 or method 300.

In addition, although not expressly specified above, one or more steps of the method 200 or method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 or FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Thus, the present disclosure provides advances in the field of network and endpoint device monitoring for location anomaly detection. The present method demonstrates that one can detect outliers in geolocation data even when there are systematic measurement errors.

Figure 4:
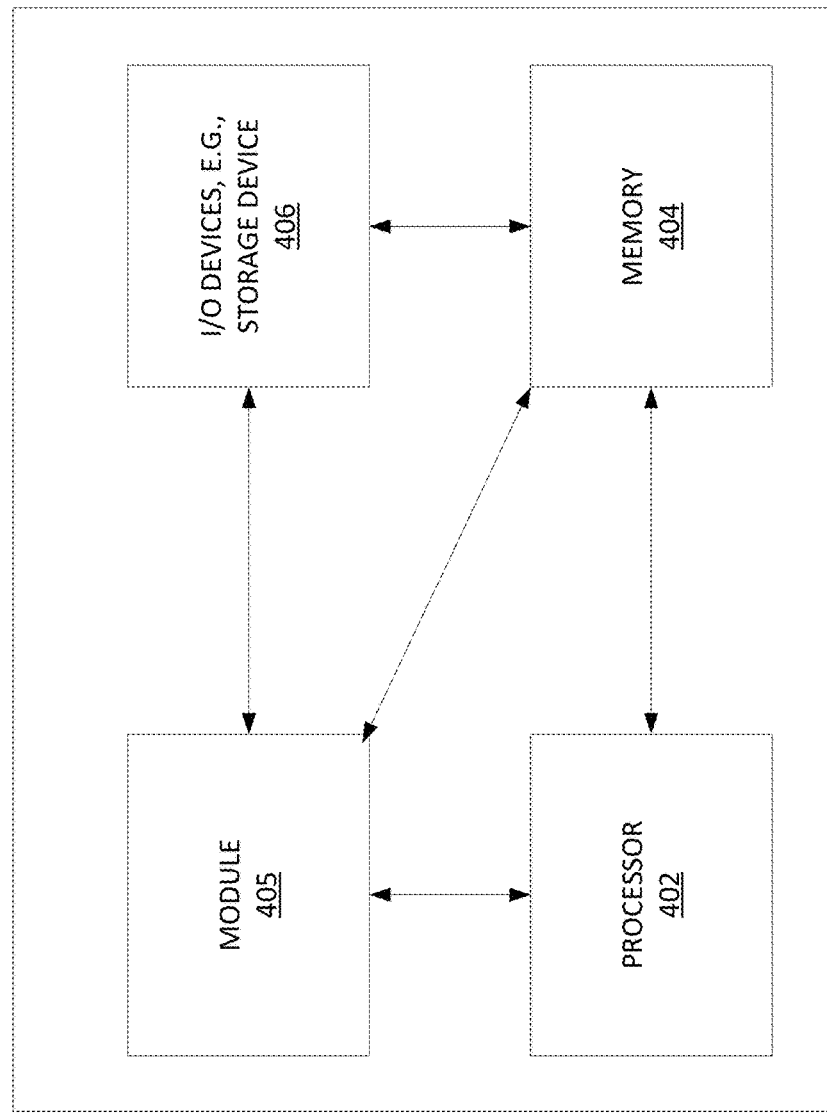
FIG. 4 illustrates a high-level block diagram of a computing device specially configured to perform the functions, methods, operations and algorithms described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for location anomaly detection, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The one or more hardware processors 402 can also be configured or programmed to cause other devices to perform one or more operations as discussed above. In other words, the one or more hardware processors 402 may serve the function of a controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed methods. In one embodiment, instructions and data for the present module or process 405 for location anomaly detection (e.g., a software program comprising computer-executable instructions) can be loaded into memory 404 and executed by hardware processor element 402 to implement the steps, functions or operations as discussed above in connection with the illustrative methods 200 and/or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer-readable or software instructions relating to the above described methods can be perceived as a programmed processor or a specialized processor. As such, the present module 405 for location anomaly detection (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
a processor; and
a computer-readable medium storing instructions which, when executed by the processor, cause the processor to perform operations, the operations comprising:
applying a regularized probabilistic model to internet protocol network traffic for performing geolocation, wherein the internet protocol network traffic contains internet protocol address information, wherein the regularized probabilistic model comprises a regularized gaussian mixture model that is restricted by a number of clusters under consideration, wherein each internet protocol address contained in the internet protocol address information is associated with a respective latitude/longitude coordinate pair, and wherein the respective latitude/longitude coordinate pair is weighted by a log-likelihood of a number of traffic events at the respective latitude/longitude coordinate pair;
determining that a datum in the internet protocol network traffic is an outlier when the log-likelihood of the number of traffic events at the respective latitude/longitude coordinate pair associated with the datum falls below a predefined threshold log-likelihood, wherein the datum is associated with a transaction over a network; and performing a remedial action to address the outlier.

2. The device of claim 1, wherein the performing geolocation is performed to account for an inaccuracy associated with a geolocation database.

3. The device of claim 1, wherein the remedial action comprises at least one of: sending a notification to an endpoint device of a user, sending a notification to an endpoint device of a financial institution, blocking traffic to the endpoint device of the user, or blocking the transaction.

4. The device of claim 1, the operations further comprising:

retraining the regularized probabilistic model on a periodic basis.

5. The device of claim 4, where the retraining the regularized probabilistic model utilizes actual data.

6. The device of claim 5, where the retraining the regularized probabilistic model further utilizes simulated data.

7. The device of claim 1, wherein the internet protocol network traffic is received from a firewall or a proxy server of the network.

8. The device of claim 1, wherein the regularized gaussian mixture model is initialized using repeated random initial assignment and keeps an assignment that maximizes the log-likelihood of the number of traffic events at the latitude/longitude coordinate pair.

9. A method comprising:

applying, by a processor, a regularized probabilistic model to internet protocol network traffic for performing geolocation, wherein the internet protocol network traffic contains internet protocol address information, wherein the regularized probabilistic model comprises a regularized gaussian mixture model that is restricted by a number of clusters under consideration, wherein each internet protocol address contained in the internet protocol address information is associated with a respective latitude/longitude coordinate pair, and wherein the respective latitude/longitude coordinate pair is weighted by a log-likelihood of a number of traffic events at the respective latitude/longitude coordinate pair;

determining, by the processor, that a datum in the internet protocol network traffic is an outlier when the log-likelihood of the number of traffic events at the respective latitude/longitude coordinate pair associated with the datum falls below a predefined threshold log-likelihood, wherein the datum is associated with a transaction over a network; and performing, by the processor, a remedial action to address the outlier.

10. The method of claim 9, wherein the performing geolocation is performed to account for an inaccuracy associated with a geolocation database.

11. The method of claim 9, wherein the remedial action comprises at least one of: sending a notification to an endpoint device of a user, sending a notification to an endpoint device of a financial institution, blocking traffic to the endpoint device of the user, or blocking the transaction.

12. The method of claim 9, further comprising:

retraining the regularized probabilistic model on a periodic basis.

13. The method of claim 12, where the retraining the regularized probabilistic model utilizes actual data.

14. The method of claim 13, where the retraining the regularized probabilistic model further utilizes simulated data.

15. A non-transitory computer-readable medium storing instructions which, when executed by a processor, cause the processor to perform operations, the operations comprising:

applying a regularized probabilistic model to internet protocol network traffic for performing geolocation, wherein the internet protocol network traffic contains internet protocol address information, wherein the regularized probabilistic model comprises a regularized gaussian mixture model that is restricted by a number of clusters under consideration, wherein each internet protocol address contained in the internet protocol address information is associated with a respective latitude/longitude coordinate pair, and wherein the respective latitude/longitude coordinate pair is weighted by a log-likelihood of a number of traffic events at the respective latitude/longitude coordinate pair;

determining that a datum in the internet protocol network traffic is an outlier when the log-likelihood of the number of traffic events at the respective latitude/longitude coordinate pair associated with the datum falls below a predefined threshold log-likelihood, wherein the datum is associated with a transaction over a network; and performing a remedial action to address the outlier.

16. The non-transitory computer-readable medium of claim 15, wherein the performing geolocation is performed to account for an inaccuracy associated with a geolocation database.

17. The non-transitory computer-readable medium of claim 15, wherein the remedial action comprises at least one of: sending a notification to an endpoint device of a user, sending a notification to an endpoint device of a financial institution, blocking traffic to the endpoint device of the user, or blocking the transaction.

18. The non-transitory computer-readable medium of claim 15, the operations further comprising:

retraining the regularized probabilistic model on a periodic basis.

19. The non-transitory computer-readable medium of claim 18, where the retraining the regularized probabilistic model utilizes actual data.

20. The non-transitory computer-readable medium of claim 19, where the retraining the regularized probabilistic model further utilizes simulated data.

* * * * *